US008968059B2

(12) United States Patent
Grimm et al.

(10) Patent No.: US 8,968,059 B2
(45) Date of Patent: Mar. 3, 2015

(54) DEVICE AND METHOD FOR PROCESSING MEAT, PARTICULARLY FISH

(75) Inventors: Oliver Grimm, Schwerin (DE); Torsten Rusko, Herrnburg (DE); Ralf Neumann, Klempau (DE)

(73) Assignee: Nordischer Maschinenbau Rud. Baader GmbH + Co.KG, Luebeck (DE)

( * ) Notice: Subject to any disclaimer, the term of this patent is extended or adjusted under 35 U.S.C. 154(b) by 356 days.

(21) Appl. No.: 13/063,872

(22) PCT Filed: Sep. 4, 2009

(86) PCT No.: PCT/EP2009/006598
§ 371 (c)(1),
(2), (4) Date: Mar. 14, 2011

(87) PCT Pub. No.: WO2010/037470
PCT Pub. Date: Apr. 8, 2010

(65) Prior Publication Data
US 2011/0171894 A1 Jul. 14, 2011

(30) Foreign Application Priority Data
Oct. 1, 2008 (DE) .................. 10 2008 050 491

(51) Int. Cl.
*A22C 25/18* (2006.01)
*A22C 25/16* (2006.01)

(52) U.S. Cl.
CPC ............ *A22C 25/16* (2013.01); *A22C 25/18* (2013.01)
USPC .......................... 452/161; 452/156

(58) Field of Classification Search
USPC .............. 452/149–150, 155–156, 160–161
See application file for complete search history.

(56) References Cited

U.S. PATENT DOCUMENTS

| 3,541,634 A | 9/1967 | Panek |
| 3,866,271 A * | 2/1975 | McNeil ............... 452/195 |
| 4,025,985 A * | 5/1977 | Rousseau ............ 452/138 |

(Continued)

FOREIGN PATENT DOCUMENTS

| BE | 520 847 A | 7/1955 |
| DE | 1 219 800 A | 6/1966 |

(Continued)

OTHER PUBLICATIONS

International Search Report of PCT/EP2009/006598 Dated Dec. 2, 2009 With an English Translation.

(Continued)

*Primary Examiner* — David Parsley
(74) *Attorney, Agent, or Firm* — Venable LLP; Robert Kinberg; Trent B. Ostler

(57) ABSTRACT

The invention concerns an apparatus for processing meat, in particular fish, comprising a processing tool, an actuating unit associated with the processing tool for moving the processing tool out of a starting position into a processing position and vice versa, and a control device which is operatively connected to the processing tool or actuating unit for control of the processing tool, which is distinguished in that the actuating unit comprises a cylinder unit having two pressure cylinders which are arranged one behind the other and connected to each other, wherein the processing tool is arranged on one of the two pressure cylinders of the cylinder unit and the two pressure cylinders can be controlled independently of each other. Furthermore, the invention concerns a corresponding method.

13 Claims, 2 Drawing Sheets

(56) References Cited

U.S. PATENT DOCUMENTS 4,091,506 A * 5/1978 Soerensen et al. ............ 452/116
4,945,607 A * 8/1990 Akesson et al. ............. 452/135
7,854,103 B2 * 12/2010 Griggs et al. ................ 53/138.1

FOREIGN PATENT DOCUMENTS

| DE | 35 42 069 A1 | 6/1986 |
|---|---|---|
| DE | 44 25 455 A1 | 1/1996 |
| DE | 102005047752 | 10/2006 |
| EP | 0341 335 A1 | 11/1989 |
| WO | WO-00/37822 | 6/2000 |

OTHER PUBLICATIONS

German Examination Report Dated Jul. 8, 2009 in German Application No. 10 2008 050 491.2.

Examination Report from the Chilean Patent Office, dated Mar. 8, 2012, issued in connection with counterpart Chilean Patent Application No. 00526-2011.

* cited by examiner

DEVICE AND METHOD FOR PROCESSING MEAT, PARTICULARLY FISH

CROSS REFERENCE TO RELATED APPLICATION

The present application is a U.S. National Stage of International Application No. PCT/EP2009/006598, filed Sep. 4, 2009, designating the United States and claiming priority to German Application No. 10 2008 050 491.2, filed Oct. 1, 2008.

BACKGROUND OF THE INVENTION

The invention concerns an apparatus for processing meat, in particular fish, comprising a processing tool, an actuating unit associated with the processing tool for moving the processing tool out of a starting position into a processing position and vice versa, and a control device which is operatively connected to the processing tool or actuating unit for control of the processing tool. Furthermore, the invention concerns a method for processing meat, in particular fish, comprising the steps of: delivering the products to be processed into the region of a processing tool, processing the products by means of the processing tool, and carrying away the processed products out of the region of the processing tool.

Such apparatuses and methods are used in the food-processing industry and in particular in the processing of meat and fish. During processing, that is, usually cutting and/or trimming of meat and in particular fish, it is necessary to control the processing tool or processing tools individually in order to obtain a satisfactory result. By the example of the surface trimming of fish fillets, this means that unwanted and/or value-reducing constituents on the surface of the fish fillets are removed. The constituents to be removed on the one hand, the different positions of the products on the other hand and also different sizes and/or contours and/or topographies here necessitate individual control and in particular adaptation of the cutting pressure to the products to be processed.

In addition to manual processing, which for understandable reasons is very expensive and also very imprecise, apparatuses in which the processing tools perform automated processing are known. For example, it is known that processing tools can be brought into contact with the products to be processed by motor. In DE 10 2005 047 752 B3 can be found an apparatus in which the processing tool is arranged on a flange element. The flange element itself is associated with a lever element which in turn is associated with a rocker arm. The lever element is additionally connected by a compensating element to the rocker arm, to adapt the cutting pressure. The compensating element can be e.g. a spring element or a pneumatic or hydraulic cylinder.

A common disadvantage of all the known apparatuses and methods, however, is that firstly they are structurally very elaborate or cumbersome to handle, and secondly stable and functioning processing cannot be achieved with the traditional means. By the example of fish fillets, it is particularly difficult to obtain a satisfactory result when processing the fillet surface. The use of spring elements or a pressure cylinder as the compensating element, particularly in case of rapid or abrupt movements, leads to "overshooting" of the processing tool, which adversely affects the processing quality.

SUMMARY OF THE INVENTION

It is therefore an object of the present invention to provide a simple apparatus by means of which stable and reliable processing is guaranteed. Furthermore, it is an object of the invention to propose a corresponding method.

This object is achieved by an apparatus of the kind mentioned hereinbefore by the fact that the actuating unit comprises a cylinder unit having two pressure cylinders which are arranged one behind the other and connected to each other, wherein the processing tool is arranged on one of the two pressure cylinders and the two pressure cylinders can be controlled independently of each other. Due to the design and arrangement according to the invention, a "suspended state", so to speak, of the processing tool can be achieved. A further advantage lies in that both the movements of the individual pressure cylinders and the mass inertia of the processing tool can be compensated, so that a stable and rapid manner of operation can be achieved.

An appropriate development of the invention is characterised in that each pressure cylinder has a separate circuit with at least one pressure valve. With this construction, the processing tool can be controlled particularly precisely for individual and exact processing.

The lower pressure cylinder may be constructed and designed as an active damping element. By this means in particular the mass inertia of the processing tool can be absorbed in a particularly effective manner.

In one embodiment, the cylinder unit may be composed of the two pressure cylinders constructed pivotably. With this construction, additional degrees of freedom which support individual processing are provided.

The processing tool in a further embodiment of the invention may be hinged to a piston rod of the lower pressure cylinder, as a result of which further degrees of freedom are provided, with the capacity of the processing tool for movement.

The object is also achieved by a method having the steps mentioned hereinbefore, by the fact that the processing tool is controlled by a first pressure cylinder for rapid delivery of the processing tool to the product and rapid lifting of the processing tool away from the product, and that the forces arising due to acceleration during rapid delivery and lifting on the one hand, and the processing force during processing on the other hand, are controlled by a second pressure cylinder. The resulting advantages have already been mentioned in connection with the apparatus according to the invention, so that reference is made to the corresponding passages to avoid repetition.

BRIEF DESCRIPTION OF THE DRAWINGS

Further appropriate and/or advantageous features and embodiments are apparent from the subsidiary claims and the description. A particularly preferred embodiment is described in more detail with the aid of the attached drawings. The drawings show:

DETAILED DESCRIPTION

The assembly shown in the figures is used for surface trimming with fish fillets. However, the assemblies are of course suitable for processing other products, in particular meat and fish products, wherein processing includes in particular cutting and trimming. The pressure cylinder assembly can however also be used, in addition to the control of separating and/or trimming elements, for the fine control of other tools such as e.g. drilling tools, grinding tools or the like.

Figure 1:
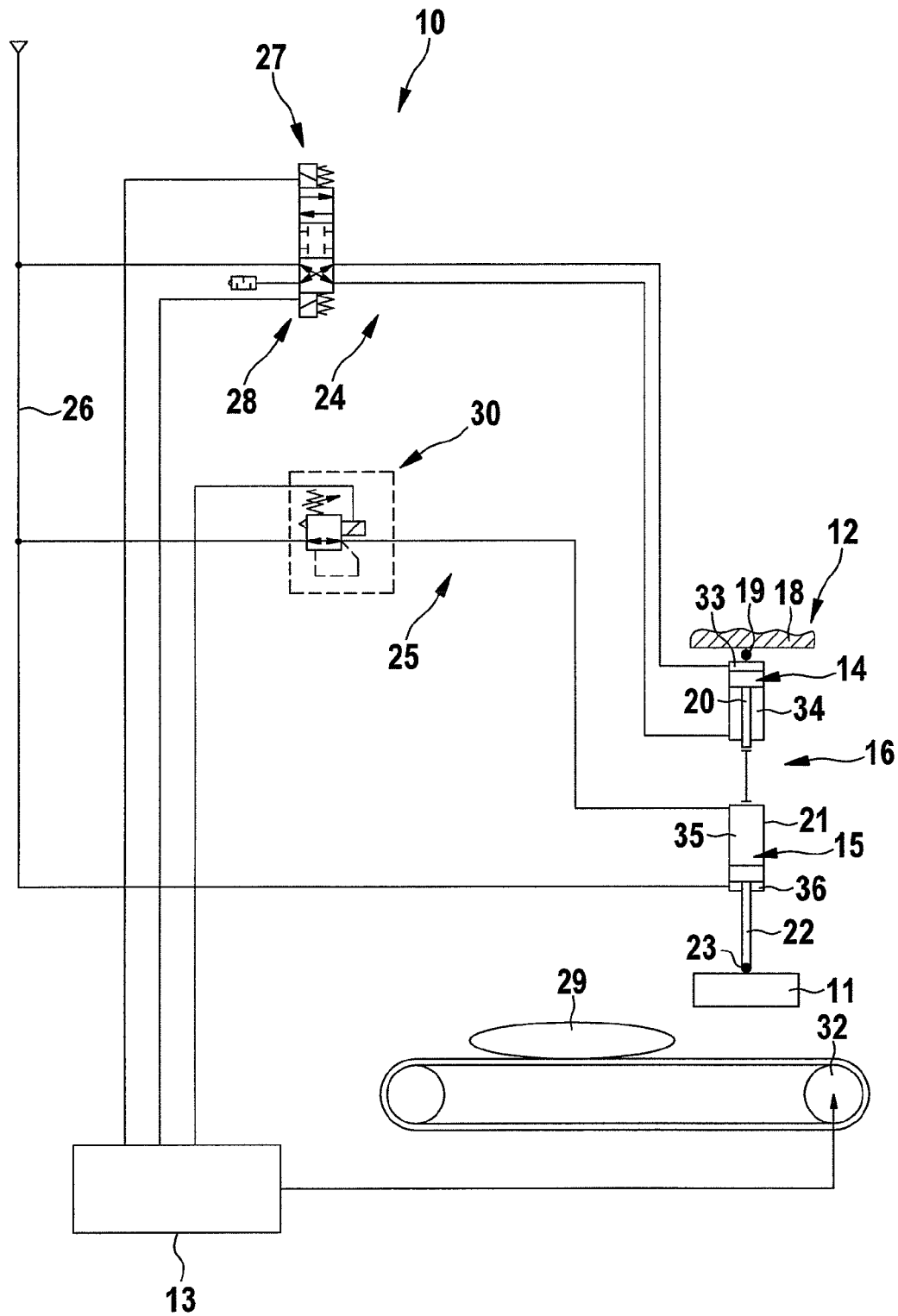
FIG. 1 a schematic view of a pressure cylinder assembly with corresponding circuit, wherein a proportional pressure regulating valve is associated with the circuit for the lower pressure cylinder, and FIG. 2 a schematic view of a pressure cylinder assembly with corresponding circuit, wherein two proportional pressure regulating valves are associated with the circuit for the lower pressure cylinder.

In FIG. 1 is shown schematically a first preferred embodiment of the apparatus 10 according to the invention. The apparatus 10 serves to process meat and in particular fish, and comprises at least one processing tool 11, an actuating unit 12 and a control device (hereinafter also referred to as a control system) 13. The actuating unit 12 is associated with the processing tool 11 for moving the processing tool 11 out of an (upper) starting position into a (lower) processing position and vice versa. The control system 13 is operatively connected to the processing tool 11 or to the actuating unit 12 for control of the processing tool 11 and, to be more precise, to perform the working movements.

Figure 2:
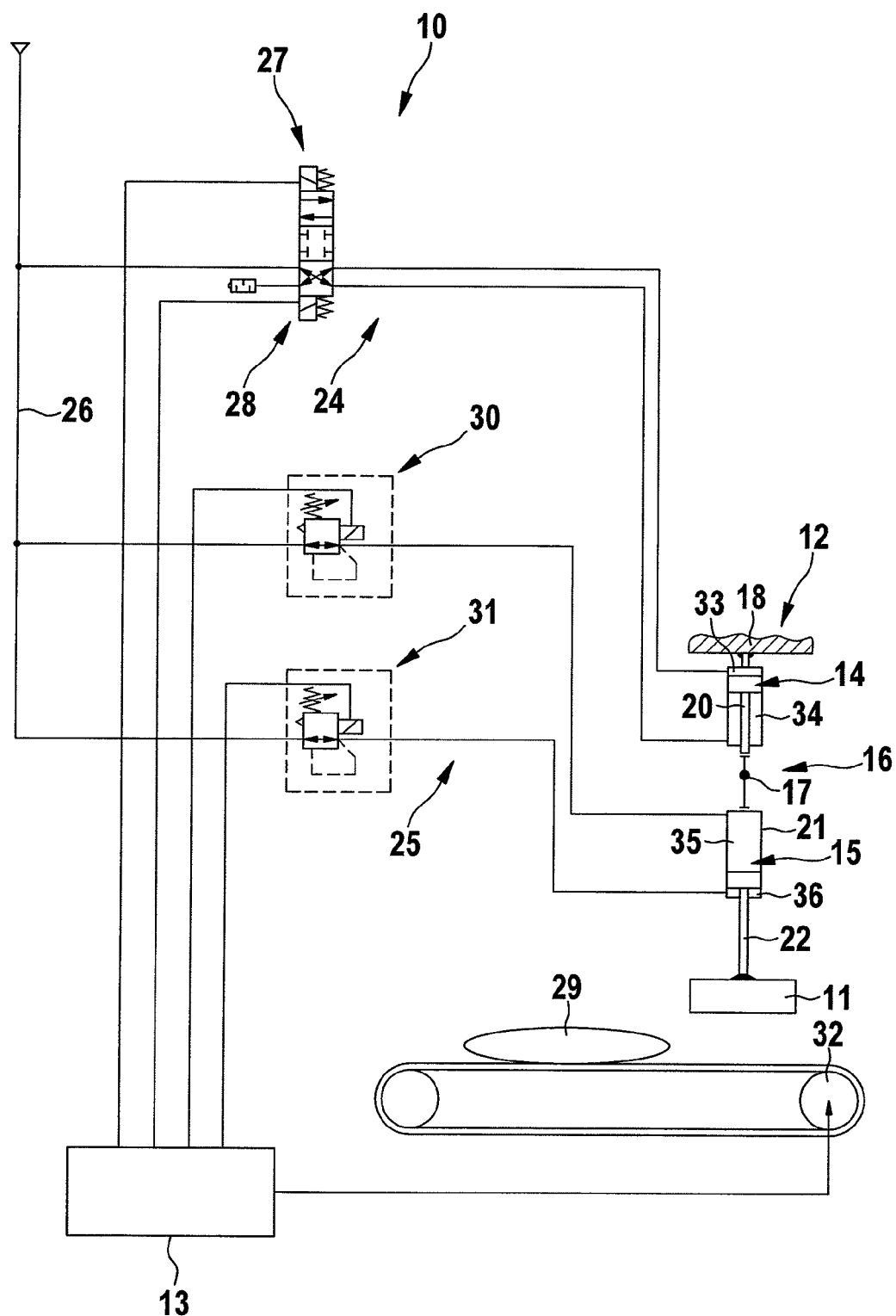

The actuating unit 12 comprises according to the invention at least two pressure cylinders 14 and 15, which form a cylinder unit 16. The pressure cylinders 14, 15, which can be actuated pneumatically or hydraulically, are arranged in series one behind the other and connected to each other. The two pressure cylinders 14, 15 can be connected to each other rigidly (see FIG. 1) or, as shown in FIG. 2, flexibly, for example via a hinge point 17. The processing tool 11 is arranged on the cylinder unit 16, namely one of the two pressure cylinders 14, 15. The two or more pressure cylinders 14, can be controlled independently of each other. For this, a separate control system can be associated with each pressure cylinder 14, 15. However, a common control system 13 as shown in the embodiment described is preferred.

The cylinder unit 16 can be arranged on a fixed element, for example a machine frame or the like. Preferably, the cylinder unit 16 is arranged on a movable element 18. The connection between the cylinder unit 16 and the movable element 18 can be made rigid (see FIG. 2) or flexible, for example via a hinge point 19 (see FIG. 1). One of the pressure cylinders 14, which is defined as the upper pressure cylinder, is arranged on the element 18. The second pressure cylinder 15, which is defined as the lower pressure cylinder, is connected to the upper pressure cylinder 14, the definition of top and bottom being as desired. To be more precise, a piston rod 20 of the upper pressure cylinder 14 is attached to the housing 21 of the lower pressure cylinder 15 directly or via the hinge point 17. Optionally, the two housings of the pressure cylinders 14, 15 can also be directly connected to each other, in which case the piston rod 20 of the upper pressure cylinder 14 protrudes upwardly and a piston rod 22 of the lower pressure cylinder 15 protrudes downwardly. Alternatively, a common housing with four chambers can be provided. The processing tool 11 is arranged on the lower pressure cylinder 15, namely on the piston rod 22 of the lower pressure cylinder 15. This connection too between piston rod 22 and processing tool 11 can be made rigid (see FIG. 2) or preferably flexible, for example via a hinge point 23 (see FIG. 1). In further embodiments the hinge points 17, 19 and 23 can also vary. This means that e.g. all connections are made flexible or all connections are made rigid or combinations thereof.

Associated with each pressure cylinder 14, 15 according to the invention is a separate circuit 24, 25. The circuits 24, 25 are connected via pipes 26 to a common pressure system, separate pressure systems being possible as well. The pipes 26 lead from the common, central pressure system to the two chambers 33, 34 or 35, 36 of the pressure cylinders 14, 15 respectively, that is, to the upper chamber 33 and the lower chamber 34 of pressure cylinder 14 or to the upper chamber 35 and the lower chamber 36 of pressure cylinder 15. To control the pressure, associated with each circuit 24, 25 is at least one valve. Preferably the circuit 24 for the upper pressure cylinder 14, which is constructed and designed preferably for rapidly moving the processing tool 11 out of the starting position into the processing position and back, has for example two pneumatic direction control valves 27, 28. The circuit 25 for the lower pressure cylinder 15, which is preferably constructed and designed for fine adjustment of the processing force of the processing tool 11 on the product 29 to be processed, preferably has a proportional pressure regulating valve 30. The proportional pressure regulating valve 30 is, as can be seen from FIG. 1, associated with the upper chamber 35 (on the piston side) of the pressure cylinder 15. In a further embodiment shown in FIG. 2, the circuit 25 can also comprise two proportional pressure regulating valves 30, 31, wherein the proportional pressure regulating valve 30 is associated with the upper chamber 35 of the pressure cylinder 15, and the proportional pressure regulating valve 31 is associated with the lower chamber 36 (on the piston rod side) of the pressure cylinder 15. Naturally, the number and design of the elements for controlling and/or regulating the pressure, that is, in particular the valves as well, can vary.

By the choice of elements for controlling and/or regulating the pressure, preferably the lower pressure cylinder 15 with the proportional pressure regulating valves 30, 31 is constructed and designed as an active damping element. Naturally, other or additional active damping members are possible as well. As already mentioned, the cylinder unit 16 is preferably constructed pivotably. The pivot movement can be produced in the most varied ways.

The apparatus 10 can be used as a conversion kit for existing processing machines. For this, the apparatus 10 is preferably arranged above a transport element 32 shown in FIGS. 1 and 2. The transport element 32 and/or a position generator (not shown), which is preferably arranged in the region of the transport element 32, can optionally be operatively connected to the control system 13. But the apparatus 10 can also form part of a processing machine for the automatic treatment and processing of products 29.

Below, the principle of the method is described in more detail with the aid of FIG. 1. Usually the product 29 to be processed is transported into the region of the processing tool 11, the processing tool 11 being in an upper starting position. The processing tool 11 is suspended from the lower one (pressure cylinder 15) of the two pressure cylinders 14, 15 forming the cylinder unit 16. In the starting position the upper pressure cylinder 14 is at the top. This means that the piston rod 20 is retracted. The lower pressure cylinder 15 or the corresponding piston rod 22 is extended. The lower pressure cylinder 15 is supplied via the proportional pressure regulating valve 30 with so much pressure (from the upper chamber 35 of the lower pressure cylinder 15) that upon rapid dropping of the processing tool 11 the pressure cylinder 15 is not retracted by the mass inertia of the processing tool 11 on acceleration. After "starting" of the upper pressure cylinder 14, that is, after the masses are accelerated by extension of the upper pressure cylinder 14, the proportional pressure regulating valve 30 directs the piston or the piston rod 22 of the lower pressure cylinder 15 to some extent into the pressure cylinder 15. Due to the fact that the lower pressure cylinder 15 in the embodiment of FIG. 1 is supplied with constant (maximum) pressure in the lower chamber 36, a reduction of pressure in the upper chamber 35 of the lower pressure cylinder 15 leads to an upwardly directed force or movement. This force/movement is used to damp the tool movement and to alter the force of application of the processing tool 11 to the product 29 during processing. To achieve this effect, the proportional pressure regulating valve 30 is constructed to influence very rapidly the effective pressure in the pressure cylinder 15, that is, in particular in the upper chamber 35. The pressure reduction in the upper chamber 35 of the lower pressure cylinder 15 is effected in particular also in order to create a buffer path, so that soft placement of the processing tool 11 on the product 29 is ensured when the upper pressure cylinder 14 (suddenly) reaches its end position.

During processing of the product 29, the processing force of the processing tool 11 is controlled or regulated via the variable pressure in the upper chamber 35 of the lower pressure cylinder 15. At the end of processing, the upper pressure cylinder 14 is retracted again, and the variable pressure of the lower pressure cylinder 15 is increased to such an extent that it cannot be retracted by the mass inertia of the processing tool 11 on braking. Optionally, the pressure of the lower pressure cylinder 15 can be varied in such a way that, upon (suddenly) reaching the upper end position of the upper pressure cylinder 14, there is soft braking of the processing tool 11 in the upper stand-by position. To sum up, it can also be said that the two pressure cylinders 14, 15 compensate each other on acceleration or braking. In other words, the rapid movement during the descent and ascent of the upper pressure cylinder 14 is damped by the lower pressure cylinder 15. As a result, a stable and rapid manner of operation is made possible.

The method with the embodiment in FIG. 2 is basically the same. However, the pressure in the lower chamber 36 of the lower pressure cylinder 15 can additionally be varied by the proportional pressure regulating valve 31, guaranteeing even more individual control of the processing tool 11.

The invention claimed is:

1. An apparatus for processing meat and fish products, comprising:
a processing tool;
an actuating unit associated with the processing tool to move the processing tool out of a starting position into a processing position and vice versa, wherein the actuating unit comprises a cylinder unit with two pressure cylinders arranged one above the other and connected to each other, with the lower pressure cylinder constituting an active damping element and comprising an upper chamber and a lower chamber, wherein the lower pressure cylinder is connected to receive a constant system pressure in the lower chamber and a variable pressure in the upper chamber to vary the pressure in the upper chamber to control forces arising due to acceleration during movement of the processing tool between the starting and processing positions and due to processing forces on the processing tool during processing, wherein the processing tool is arranged on one of the two pressure cylinders and the two pressure cylinders are controllable independently of each other; and
a control device operatively connected to the processing tool or actuating unit to control the processing tool.

2. The apparatus according to claim 1, further comprising two separate circuits each with at least one valve operatively associated with, respectively, the two pressure cylinder.

3. The apparatus according to claim 1, wherein the at least one valve of the circuit associated with the lower pressure cylinder comprises at least one proportional pressure regulating valve.

4. The apparatus according to claim 3, wherein the processing tool is arranged on the lower pressure cylinder.

5. The apparatus according to claim 1, wherein the cylinder unit is arranged to be pivotable.

6. The apparatus according to claim 1, wherein the lower pressure cylinder includes a piston rod and the processing tool is pivotably arranged on the piston rod.

7. The apparatus according to claim 1, wherein the pressure cylinders are pneumatically or hydraulically operated.

8. The apparatus according to claim 2, wherein the control device is a common control device connected to both circuits.

9. A method for processing meat and fish products, comprising the steps of:
delivering the products to be processed into a region of a processing tool;
processing the products by the processing tool, including:
controlling a first pressure cylinder coupled to the processing tool for rapid delivery of the processing tool to the product and for rapid lifting of the processing tool away from the product, and
controlling forces arising due to acceleration during rapid delivery and lifting on the one hand and a processing force during the processing on the other hand with a second pressure cylinder connected, on one end, to and below the first pressure cylinder to form a cylinder unit and coupled, at another end, to the processing tool, wherein the second pressure cylinder has an upper chamber and a lower chamber respectively above and below a piston, wherein the second pressure cylinder is connected to receive a constant system pressure in the lower chamber and a variable pressure in the upper chamber to vary the pressure in the upper chamber for controlling the forces arising due to acceleration and processing; and
carrying away the processed products out of the region of the processing tool.

10. The method according to claim 9, including controlling the first and second pressure cylinders in each case by separate circuits.

11. The method according to claim 9, wherein the controlling of the first pressure cylinder includes controlling the first pressure cylinder by pneumatic or hydraulic valves for rapid descent and ascent of the processing tool.

12. The method according to claim 9, including pivoting the cylinder unit during the processing.

13. The method according to claim 9, including pivoting the processing tool relative to the cylinder unit.

* * * * *